(No Model.)

T. D. BROWN.
DUST PAN.

No. 351,423. Patented Oct. 26, 1886.

WITNESSES
C. H. Raeder
Wm Turner

INVENTOR
Timothy D Brown
By T. J. W. Robertson
Attorney

UNITED STATES PATENT OFFICE.

TIMOTHY D. BROWN, OF OAKLAND, CALIFORNIA.

DUST-PAN.

SPECIFICATION forming part of Letters Patent No. 351,423, dated October 26, 1886.

Application filed February 13, 1886. Serial No. 191,871. (No model.)

*To all whom it may concern:*

Be it known that I, TIMOTHY D. BROWN, a citizen of the United States, residing at Oakland, in the county of Alameda and State of California, have invented certain new and useful Improvements in Dust-Pans, of which the following is a specification, reference being had therein to the accompanying drawings, in which—

Figure 1:
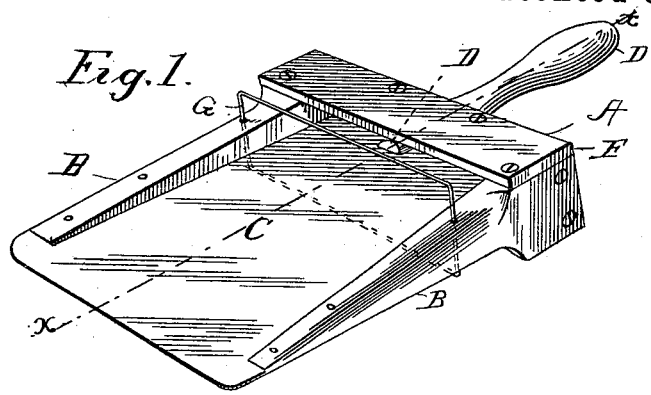
Figure 2:
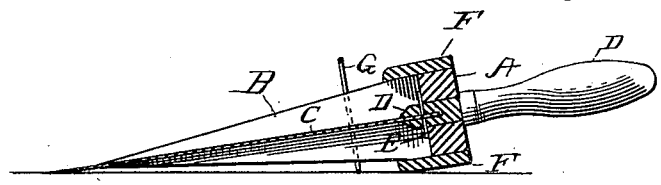
Figure 3:
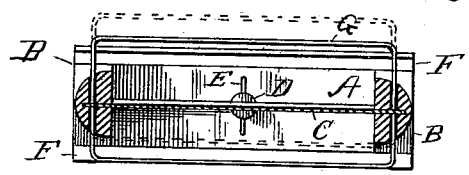
Figure 4:
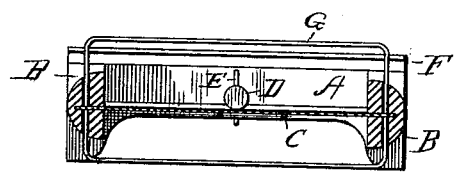

Figure 1 shows a perspective view of a dust-pan constructed according to my improvement. Fig. 2 is a vertical section through the line $x$ $x$ in Fig. 1. Fig. 3 is another vertical section at right angles to that shown in Fig. 2, and Fig. 4 is a similar section of a modification.

This invention relates to a dust-pan designed to be reversed, so as to be used either side upward, and so arranged as to hold the rear of the pan from the floor and the front edge close to the same; and it consists in the peculiar construction, arrangement, and combination of parts, shown in the drawings and hereinafter described, and then more particularly pointed out in the claims.

Referring to the drawings, A represents the head of the dust-pan; B, the sides, which may be made either of wood or metal, but preferably the former. Both the head and sides are grooved to receive the bottom C, which is preferably made of sheet metal, so as to slide into the grooves in the head and sides. The head is provided with a hole through which one end of the handle D is passed, and the inner extremity of said handle is split or grooved to receive the inner edge of the bottom. A pin, E, is passed through that portion of the handle projecting on the inside of the pan and through the bottom, so that the sheet-metal bottom and the handle are both held in place by the same pin. As a further security I may put in pins, tacks, or screws through the sides to hold the sides and bottom together, but this is not actually necessary. At the top and bottom of the sides and head I fasten strips F, to act as guards to keep the dust, &c., from being accidentally knocked or swept over the head.

When the dust-pan is designed to be used for heavy work, as in stables, &c., I prefer to add a double bail, G, which is made of heavy wire, and passes loosely through holes in the sides, so as to allow the bail to slide in said holes, and it can thus be readily used as a bail, with either side of the dust-pan upward.

With the construction shown I produce a dust-pan which can be used with either side upward, and which will always have its edge in position to allow the dirt, &c., to be swept into it without the necessity of any one holding the same, as is generally required with the dust-pan commonly used.

It is evident that the pan may be changed in form without departing from the spirit of my invention—for instance, if it is not desired to use the pan as a double one—that is to say, so that it may be used either side up—the pan may be made as shown in Fig. 4, with the most of the head on the upper side and projections below, so as to elevate the back of the dust-pan from the floor, and thus keep the front edge down upon the floor for convenience in sweeping without the necessity of holding the pan in position.

What I claim as new is—

1. A dust-pan provided with a head and sides projecting above and below the bottom, whereby it may be used either side upward, substantially as described.

2. A dust-pan provided with the wooden head A and the sides B, constructed to receive a sheet-metal bottom, and the sides extending to near the front edge of said bottom to strengthen the same, substantially as described.

3. A reversible dust-pan provided with a bottom, and a bail extending upon both sides of said bottom and working vertically in guides on the frame, substantially as described.

4. A dust-pan provided with a substantially rectangular bail sliding through guides formed in the sides of the frame thereof, substantially as described.

5. The combination, in a dust-pan, of the head A, sides B, bottom C, fitting in a groove in said head and sides, handle D, passing through said head, and the pin E, passing through said handle and bottom, substantially as described.

In testimony whereof I affix my signature, in presence of two witnesses, this 10th day of February, 1886.

TIMOTHY D. BROWN.

Witnesses:
JOHN SMITH,
ERNEST A. BENNETT.